(12) United States Patent
Paatero et al.

(10) Patent No.: US 8,926,730 B2
(45) Date of Patent: Jan. 6, 2015

(54) METHOD FOR RECOVERING GOLD BY SOLVENT EXTRACTION

(75) Inventors: Erkki Paatero, Helsinki (FI); Mika Haapalainen, Pori (FI)

(73) Assignee: Outotec Oyj, Espoo (FI)

( * ) Notice: Subject to any disclaimer, the term of this patent is extended or adjusted under 35 U.S.C. 154(b) by 46 days.

(21) Appl. No.: 13/702,232

(22) PCT Filed: Jun. 7, 2011

(86) PCT No.: PCT/FI2011/050532
§ 371 (c)(1),
(2), (4) Date: Dec. 5, 2012

(87) PCT Pub. No.: WO2011/154603
PCT Pub. Date: Dec. 15, 2011

(65) Prior Publication Data
US 2013/0104701 A1    May 2, 2013

(30) Foreign Application Priority Data

Jun. 9, 2010 (FI) .................................... 20100243

(51) Int. Cl.
| | | |
|---|---|---|
| *C22B 3/00* | (2006.01) | |
| *C25C 1/20* | (2006.01) | |
| *C01G 7/00* | (2006.01) | |
| *C22B 3/26* | (2006.01) | |

(52) U.S. Cl.
CPC . *C22B 11/04* (2013.01); *C01G 7/00* (2013.01); *C22B 3/0005* (2013.01); *C22B 3/0009* (2013.01); *C22B 11/042* (2013.01); *C25C 1/20* (2013.01); *C01P 2002/80* (2013.01); *C01P 2004/03* (2013.01)
USPC ............................. 75/711; 210/634; 210/757

(58) Field of Classification Search
CPC ............................. C22B 3/0018; C22B 11/04
USPC ..................................... 75/711; 210/634, 757
See application file for complete search history.

(56) References Cited

U.S. PATENT DOCUMENTS

| | | | | |
|---|---|---|---|---|
| 2,227,833 A | * | 1/1941 | Hixson et al. ...................... 423/8 |
| 4,499,057 A | * | 2/1985 | Burgard et al. ................... 423/8 |

(Continued)

FOREIGN PATENT DOCUMENTS

| | | |
|---|---|---|
| DE | 3225230 A1 | 5/1983 |
| ES | 2330224 T3 | 12/2009 |

(Continued)

OTHER PUBLICATIONS

International Search Report (PCT/ISA/210) issued on Sep. 26, 2011, by the Finnish Patent Office as the International Searching Authority for International Application No. PCT/FI2011/050532.

(Continued)

*Primary Examiner* — George Wyszomierski
*Assistant Examiner* — Tima M McGuthry Banks
(74) *Attorney, Agent, or Firm* — Buchanan, Ingersoll & Rooney, PC

(57) ABSTRACT

The invention relates to a method for recovering gold by solvent extraction from an acidic chloride-containing aqueous solution or from slurry containing gold-bearing solids using a diester-based reagent that is poorly soluble in water as organic extraction solution. In accordance with the method, gold is extracted extremely effectively, but other precious metals and many other metals quite sparingly. Gold is stripped from the extraction phase with pure water, from which the gold can be reduced either chemically or electrochemically.

26 Claims, 4 Drawing Sheets

(56) References Cited

U.S. PATENT DOCUMENTS

| | | | |
|---|---|---|---|
| 4,978,788 | A | 12/1990 | Dalton et al. |
| 6,733,688 | B1 | 5/2004 | Sugarman et al. |
| 7,157,062 | B2 * | 1/2007 | Perez et al. .................. 423/25 |
| 7,309,474 | B2 * | 12/2007 | Soderstrom .................. 423/24 |
| 2003/0228245 | A1 | 12/2003 | Perez et al. |
| 2004/0208807 | A1 | 10/2004 | Soderstrom |
| 2006/0192175 | A1 | 8/2006 | Sudderth et al. |
| 2011/0083531 | A1 | 4/2011 | Soldenhoff et al. |

FOREIGN PATENT DOCUMENTS

| | | |
|---|---|---|
| JP | S 61-272328 A | 12/1986 |
| JP | H 2-59551 A | 2/1990 |
| JP | 2003-503182 A | 1/2003 |
| JP | 2011-513583 A | 4/2011 |
| RU | 1741436 C | 1/1995 |
| WO | WO 03/104503 A1 | 12/2003 |
| WO | WO 2009/105832 A1 | 9/2009 |

OTHER PUBLICATIONS

Written Opinion (PCT/ISA/237) issued on Sep. 26, 2011, by the Finnish Patent Office as the International Searching Authority for International Application No. PCT/FI2011/050532.

Search Report issued on Feb. 18, 2011, by the Finnish Patent Office for Application No. 20100243.

Wirths et al., "Reinstdarstellung und Reinsterhaltung bei der Verformung von Metallen—am Beispiel der Metalle Silber, Gold und Platin, Bundesministerium für Forschung und Technologie Forschungbericht", Technologische Forschung und Entwicklung, pp. 77-54, Dec. 1975.

"2,2,4-Trimethyl-1,3-Pentanediol Diisobutyrate", OECD SIDS, CAS No. 6846-50-0, Feb. 1995, pp. 1-34, UNEP Publications.

Hoffmann et al., "Hydrometallurgical processing of Kennecott Refinery slimes", Proceedings of COPPER 95-COBRE 95 International Conference, 1995 (month unknown), pp. 41-57.

Marsden et al., The chemistry of gold extraction, Solution Purification and Concentration, 1960 (month unknown), pp. 353-359, chapter 7.

Grant et al., "The Application of Solvent Extraction to the Refining of Gold", Proceedings of the International Solvent Extraction Conference, ISEC, 2002 (month unknown), pp. 940-945.

Toraiwa et al., "Development of Hydrometallurgical Process of Copper Anode Slimes in Nippon Mining & Metals", Journal of the Mining and Materials Processing Institute of Japan, 2000 (month unknown), pp. 1-21.

Lopatin et al., Izv. Vyssh. Ucheb. Zavedenii, Tsvet. Mat. 4(4), 1961 (month unknown).

Japan Office Action (Notification of Reason for Refusal) dated Jan. 28, 2014, issued in corresponding Japanese Patent Application No. 2013-513722 with an English translation thereof. (4 pgs).

Colombia Office Action dated Jul. 6, 2011, issued by the National Patent Office in corresponding Colombian Patent Application No. 13003382 (16 pgs).

* cited by examiner

METHOD FOR RECOVERING GOLD BY SOLVENT EXTRACTION

FIELD OF THE INVENTION

The invention relates to a method for recovering gold by solvent extraction from an acidic chloride-based aqueous solution or slurry containing a gold-bearing solid using a diester-based reagent that is poorly soluble in water as the organic extraction solution. In accordance with the method, gold is extracted extremely effectively, but other precious metals and most other metals are only extracted a little. Gold is stripped from the extraction phase with pure water, from which the gold can be reduced either chemically or electrochemically.

BACKGROUND OF THE INVENTION

In metal fabrication processes solvent extraction is generally used, by means of which metals can be extracted from aqueous solutions using organic extraction solutions. It was previously known that gold could be extracted from a solution of hydrochloric acid using some ketone such as methyl butyl ketone, phosphate such as tributyl phosphate, alkyl amine, and long-chained ether such as diethyl glycol dibutyl ether as extractant. The last-mentioned is also known by the abbreviation BUTEX and by the name dibutyl carbitol or DBC, and is in use in industrial processes. The book "The chemistry of gold extraction" (reference 1) provides a good overview of current known extraction methods.

Gold can be extracted very effectively with DBC, but it has been found to have several negative properties, which are described in reference (1). In industrial processes, such as the Hoffmann process (2), it has been observed that the DBC phase settles very slowly from the aqueous phase, which has complicated both the extraction stage and the scrubbing stage of the extraction phase. In addition, the solubility of DBC in water is extremely high (approx. 3 g/L, 25° C.), leading to reagent losses in the extraction and scrubbing stages. The flash point of DBC is also relatively low. Since DBC binds gold so strongly, the gold has to be reduced directly from the organic phase. Generally, reduction is performed at an elevated temperature using an oxalate. Along with the reduced gold precipitate, a loss of expensive extractant is also generated. In addition, the unpleasant smell of DBC requires special arrangements regarding the working environment.

It is known in the literature (3) that long-chain alcohols also extract gold. Among others, Grant (4) has presented and shown empirically that DBC could be replaced with long-chain alcohols. WO application publication 2009105832 is based on the use of the same long-chain alcohols for gold extraction from a solution of hydrochloric acid.

When using long-chain alcohols as the extractant, an aliphatic hydrocarbon mixture is used as diluent in the above-mentioned article by Grant and in the WO application publication. However, it is known that the hydrocarbon diluents in question may oxidise in process conditions, whereupon surface-active long-chain carboxyl acids etc. are generated. This change of the solvent is unfavourable for the extraction process, since it impairs settling and may increase the extraction of impurity metals.

PURPOSE OF THE INVENTION

The purpose of this invention is to disclose a method that enables the extraction of gold by means of an reasonable extractant and avoids the problems of the methods described in the prior art.

SUMMARY OF THE INVENTION

The method relates to a method for extracting gold selectively from its acidic chloride-containing aqueous solution or from solids-containing slurry by solvent extraction to produce pure gold. A diester of 2,2,4-trialkyl-1,3-pentanediol is used as the extractant of the organic extraction solution in solvent extraction and after the extraction stage the gold-bearing organic solution is scrubbed with an acidic aqueous solution, after which the gold is stripped into water, from where it is reduced to form pure gold.

According to one embodiment of the invention, a mixture of a diester of 2,2,4-trialkyl-1,3-pentanediol and branched long-chain alcohol may also be used as extraction reagent.

According to one preferred embodiment of the invention, the diester of 2,2,4-trialkyl-1,3-pentanediol is 2,2,4-trimethyl-1,3-pentanediol di-isobutyrate or a derivative of it.

According to one preferred embodiment of the invention, the branched long-chain alcohol is 2-ethylhexanol.

According to another embodiment of the invention, in the molecule structure of 2,2,4-trimethyl-1,3-pentanediol di-isobutyrate there is a hydrogen atom or some other alkyl group or aryl group instead of one or more methyl groups in the side chains.

According to one embodiment of the invention, extraction takes place simultaneously with the dissolving of the gold-bearing solid contained in the slurry. The gold-bearing solid is preferably at least one of the following: gold ore, concentrate, anode slime, scrap, ash, or ion exchanger, activated carbon or adsorbent used in gold recovery.

It is typical of the method accordant with the invention that after the solvent extraction stage, the gold-bearing organic extraction solution is routed to a scrubbing stage to scrub out the impurity metals extracted into the extraction solution, where an aqueous solution of hydrochloric acid is used as scrubbing solution, in which the hydrochloric acid concentration is 1.5-8 mol/L, preferably 2-6 mol/L. The scrubbing stage advantageously contains at least two scrubbing steps, where the hydrochloric acid concentration in its aqueous solution is greater than 2.0 mol/L in the first scrubbing step and the hydrochloric acid concentration of the second scrubbing step is the same or lower than in the first scrubbing step.

According to one embodiment of the invention, the selenium, tellurium and antimony extracted into the organic extraction solution is scrubbed out of it in the scrubbing stage and the scrubbing solution is routed to a selenium extraction stage, in which a diester is used as the organic extraction solution.

According to one preferred embodiment of the invention, the gold stripping stage from the organic extraction solution is performed as crosscurrent extraction. The gold stripping stage from the organic extraction solution is performed after the scrubbing stage preferably in at least two steps using pure water in each stage. According to another embodiment, the stripping stage is carried out as countercurrent extraction.

According to one embodiment of the invention, the gold-bearing aqueous solutions exiting the stripping steps are combined and pure gold is recovered in a reduction stage of the aqueous solution from stripping.

According to one embodiment of the invention, gold is reduced from the aqueous solution by means of oxalic acid or its salt. According to another embodiment of the invention, gold is reduced from the aqueous solution by means of sodium borohydride. According to yet another embodiment of the invention, gold is reduced from the aqueous solution by electrolysis.

LIST OF DRAWINGS

Figure 3:
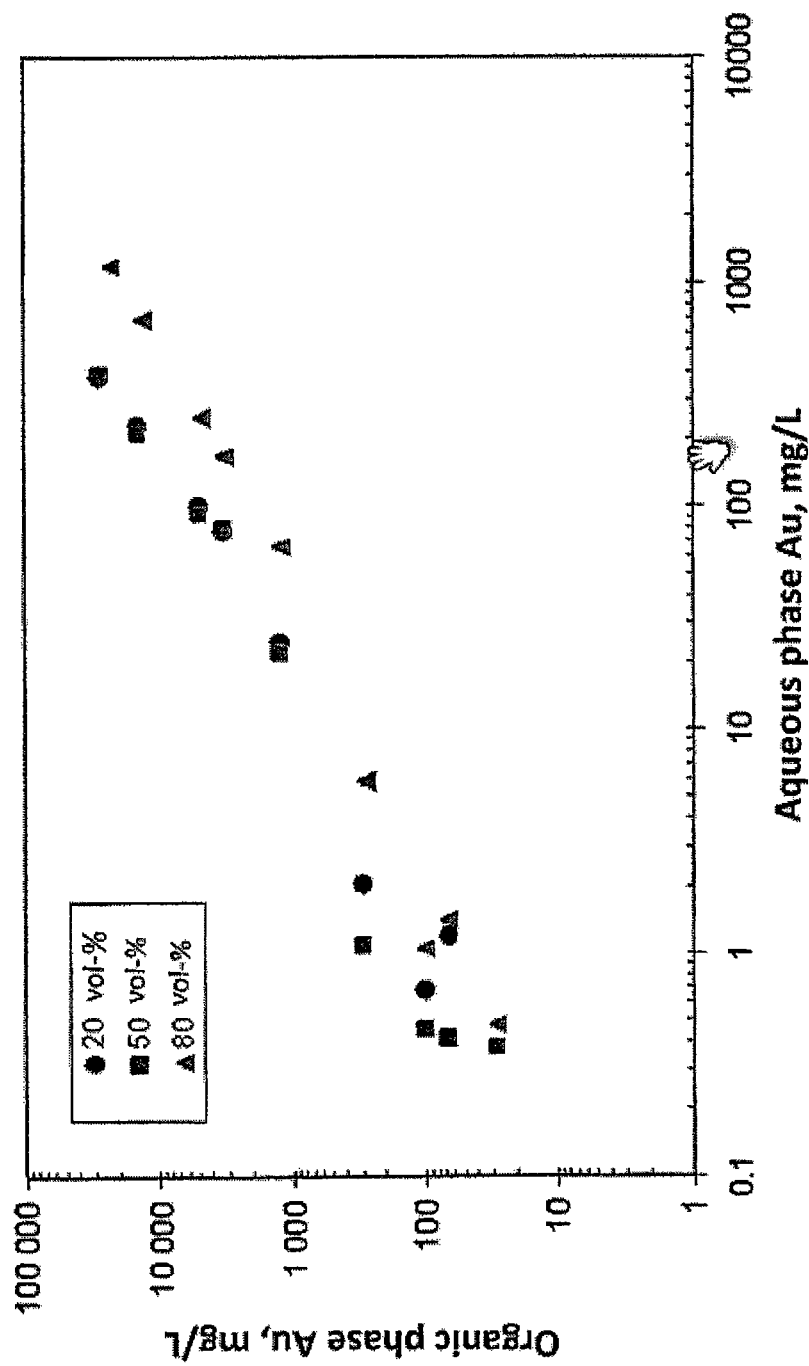
Figure 4:
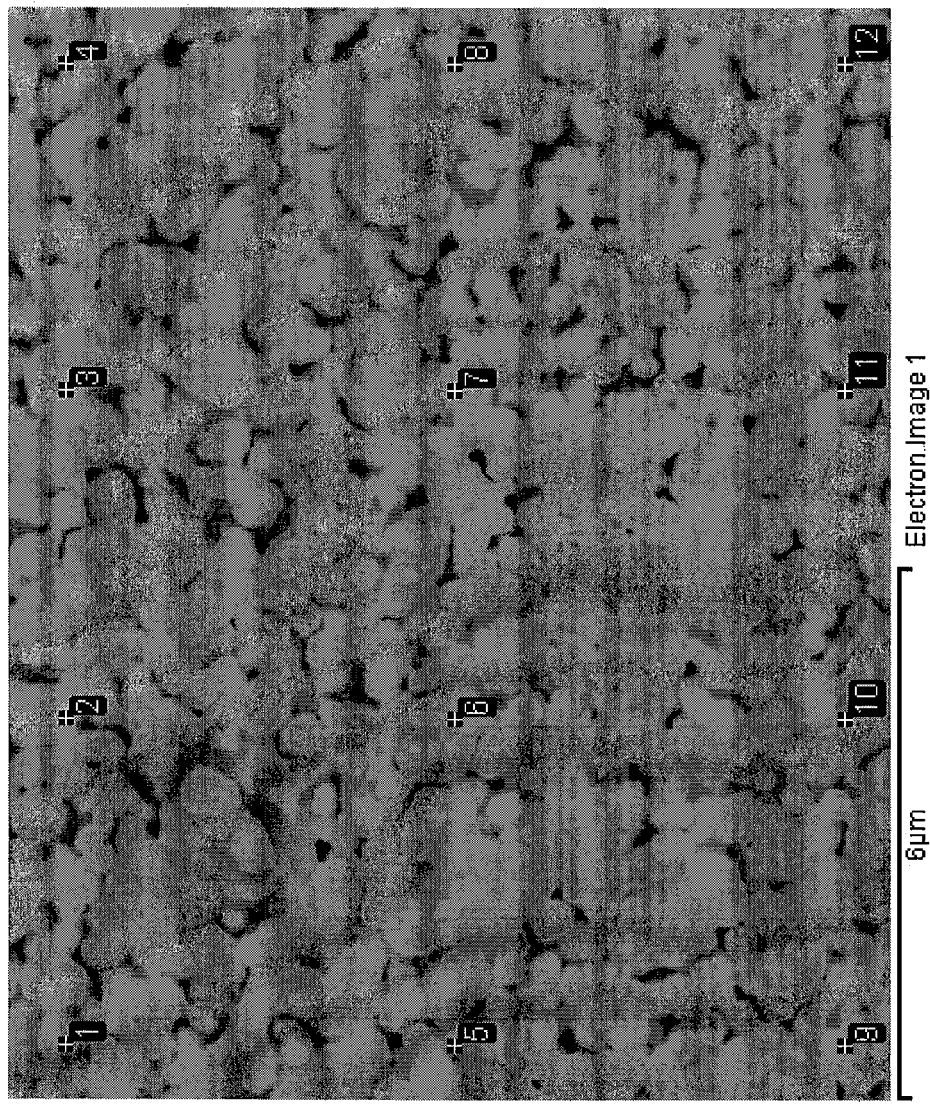

FIG. 3 presents the extraction of gold into a diester at different concentrations, and FIG. 4 is a scanning electron microscope image of reduced gold.

DETAILED DESCRIPTION OF THE INVENTION

By means of the method accordant with the invention, gold can be extracted selectively from an acidic aqueous solution or slurry, in which there is a gold-bearing solid, and pure metallic gold can be produced. A suitable diester is preferably used as the extraction reagent in the organic extraction solution, either alone or together with a long-chain alcohol. The extraction solution does not contain any actual hydrocarbon solvent at all. The terms organic phase, organic extraction reagent and organic extraction solution used hereafter all mean the same thing.

In the method accordant with the invention a gold extraction reagent is a diester of 2,2,4-trialkyl-1,3-pentanediol and highly suitable is 2,2,4-trimethyl-1,3-pentanediol di-isobutyrate (CAS No. 6846-50-0) described in the molecular structure below. This diester is used generally in the plastics industry, there are several industrial manufacturers and it is reasonable in price. At room temperature the substance is liquid (melting point and boiling point 282° C.). In comparison with DBC for instance, the benefits of the extraction reagent are its low solubility in water (approx. 15 mg/L, 25° C.) and high flash point of 134° C. Additionally, in research (5) no problems regarding work hygiene or the environment have been reported.

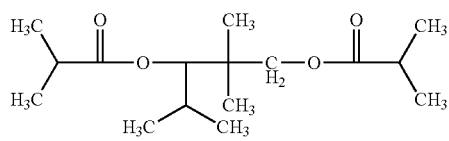

As far as the extraction characteristics of gold are concerned, the oxygen atoms in the molecular structure of the diester of 2,2,4-trialkyl-1,3-pentane-diol are essential, but for instance the structure of the carbon chain is not so essential. The invention therefore also relates to molecules in which the side chains of the molecule construction above contain an H atom or some other alkyl group or aryl group instead of one or several methyl groups. When there is later used the word diester in the specification it means the diester of 2,2,4-trialkyl-1,3-pentanediol described above.

Gold extraction is based on the fact that the diester (=B) is what is known as a Lewis base, which extracts gold from acidic chloride solution in accordance with the following mechanism:

$$B_{org} + (HAuCl_4)_{aq} \rightarrow (BH^+AuCl_4^-)_{org} \quad (1)$$

(B=diester molecule)
so that an ion pair is generated in the organic phase.

It was observed in the tests performed that although the diesters extracted gold extremely well, for phase settling it is advantageous to dilute them with a long-chain alcohol, which is also known to extract gold. However, a diester extracts gold from chloride solution considerably more weakly than the earlier mentioned DBC, and the benefit of this is that stripping can succeed with water. As shown in example 1 of the invention, the mixture ratio of diester and alcohol in the extraction reagent affects the gold distribution factor and provides an opportunity to optimise the whole process according to the composition of the feed.

Figure 1:
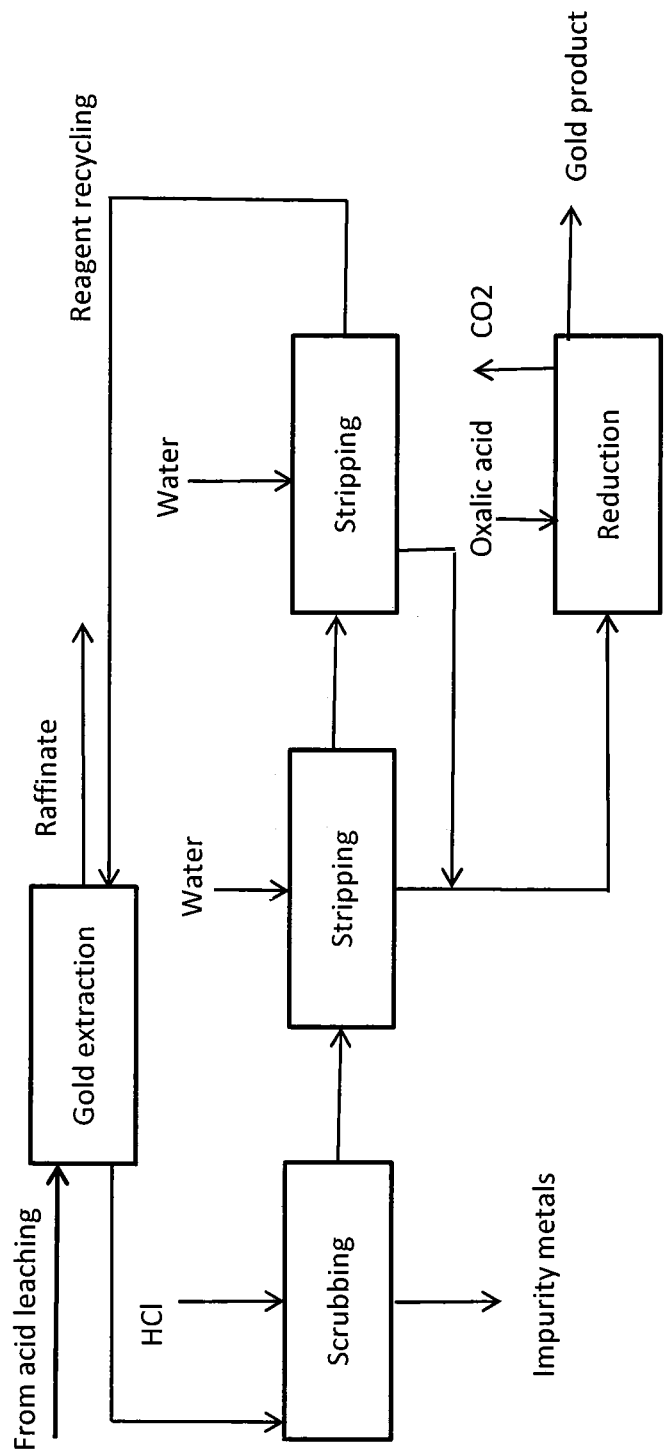
FIG. 1 is a principle drawing of one embodiment of the invention.

FIG. 1 presents a principle diagram of gold recovery. A gold-bearing acidic chloride-based aqueous solution or slurry exiting acid leaching, where said solution contains a gold-bearing solid, is routed to the extraction stage. Besides chloride the aqueous solution may also contain small amounts of bromide or iodide. The extraction stage may take place in one or several steps, but it has been found that even with an extraction stage of only one step good results can be achieved.

After the extraction stage, the organic extraction solution is routed to a scrubbing stage, in which it is scrubbed with an acidic aqueous solution in order to remove the metals other than gold and the impurities out of the extraction solution. Other metals in the aqueous solution or slurry containing gold are for instance precious metals other than gold, as well as platinum, copper, iron, antimony, arsenic, selenium, tellurium and bismuth. Some of these are extracted into the organic extraction solution in small amounts as impurities. The gold-depleted aqueous solution or raffinate can be fed for example back to the gold leaching stage (not shown in detail in the diagram). An aqueous solution of hydrochloric acid has proved advantageous as the scrubbing liquid for the extraction solution, since it can be recycled after scrubbing to the gold leaching stages. The concentration of the hydrochloric acid in scrubbing is 1.5-8 mol/L and preferably 2-6 mol/L, so that the gold is not scrubbed out along with the impurities. It is advantageous to perform scrubbing in at least two steps. In the first scrubbing step the concentration is preferably greater than 2.0 mol/L. In the second scrubbing step the hydrochloric acid concentration may be the same or different, for instance lower, than in the first step. The hydrochloric acid concentration chosen depends on the quality and quantity of the impurity metals extracted into the organic extraction solution.

The organic extraction solution is routed from the final scrubbing step to the stripping stage. It is advantageous to carry out stripping into pure water, whereupon the tetrachloro complex of the gold is broken up. It is preferable to perform stripping in several steps, either as countercurrent or crosscurrent extraction. In the crosscurrent extraction accordant with FIG. 1 a separate scrubbing liquid is routed into each scrubbing step, which in this case is pure water fed into both steps. In this case crosscurrent extraction is preferred because chloride is also scrubbed out of the organic phase in stripping. It is advantageous for gold stripping that the chloride concentration of the water is as low as possible in each step.

The aqueous solutions from the steps of the stripping stage are combined and routed to the reduction stage. Reduction is carried out for instance with oxalic acid or sodium oxalate or a mixture of the two. The reduction reactions are as follows and as a result a pure pulverous gold product is obtained:

$$2HAuCl_4 + 3(CO_2H)_2 \rightarrow 2Au + 6CO_2 + 8HCl \quad (2)$$

$$2HAuCl_4 + 3(CO_2Na)_2 \rightarrow 2Au + 6CO_2 + 6NaCl + 2HCl \quad (3)$$

Gold can also be reduced from aqueous solution by means of electrolysis. The carbon dioxide generated in the oxalate reduction of gold may be absorbed by a suitable scrubbing solution using known methods. The amount of carbon dioxide is proportional to the amount of gold generated i.e. it is completely marginal and does not affect the process or its economic viability.

However, it is clear that, in the same way as extracting gold from a gold-bearing solution, gold ore, concentrate or some other gold-bearing solid such as anode slime, ash, scrap or the ion exchange material, activated carbon or adsorbent used in gold recovery can be treated with the method accordant with the invention or solvent-in-leach (SIL) method, where extraction is performed directly from the solids-bearing hydrochloric acid solution, i.e. from the slurry without a separate leaching stage.

The gold-bearing solution or slurry, such as for example an anode slime, may also contain selenium and sometimes also tellurium and antimony. In tests in which there was not only gold in the feed exiting acid leaching but also selenium, it was observed surprisingly that the diester also extracts selenium. The observation differs from the behaviour of selenium in connection with DBC for instance, in that selenium is known to stay in the extraction raffinate i.e. in the post-extraction aqueous solution (6).

Figure 2:
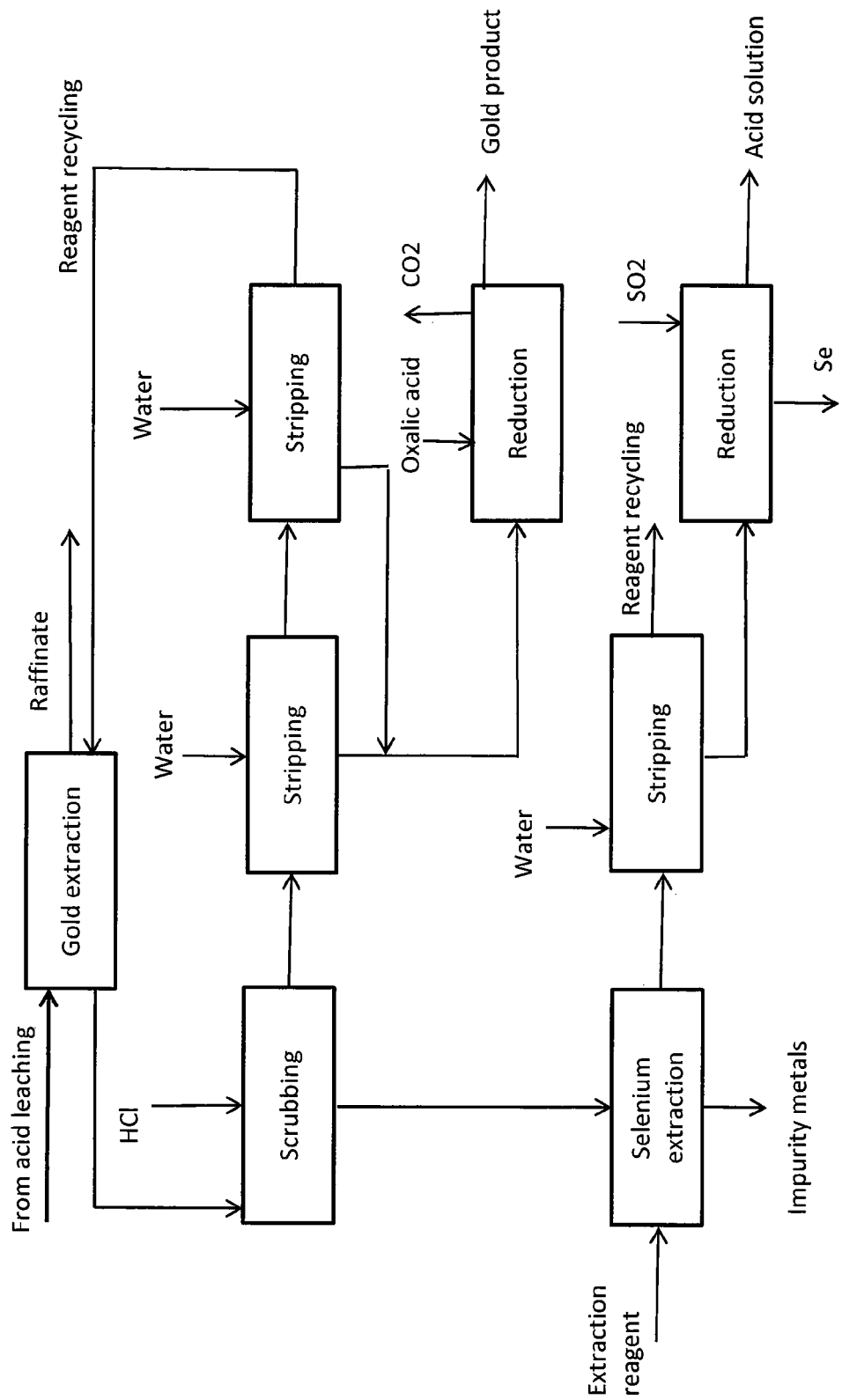
FIG. 2 is a principle drawing of another embodiment of the invention.

A process chart is presented in FIG. 2, according to which the selenium and any tellurium and antimony extracted into the organic extraction solution can be recovered. According to the chart, selenium is extracted once again into the diester reagent and stripped into the aqueous phase. The precipitation of selenium can be done by known methods, for instance by reduction with sulphur dioxide in accordance with reference (2).

EXAMPLES

Example 1

A test on the suitability of a diester of 2,2,4-trialkyl-1,3-pentanediol-based extraction reagent mixture for gold extraction was performed in the laboratory. The feed solution was prepared by first leaching pure gold into an 8 M hydrochloric acid solution at 40° C., using hydrogen peroxide as oxidant.

The extraction reagent used was a diester, which has the exact chemical name of 2,2,4-trimethyl-1,3-pentanediol di-isobutyrate. The diester was diluted in the 2-ethylhexanol used as alcohol so that the proportion of diester was 20, 50 or 80 vol %. Equilibrium tests were made in a test tube at a temperature of 40° C.

The test results in FIG. 3 show that gold is extracted very effectively at all mixture ratios. It can be calculated from the results that the value of the distribution factor is at best around 70, and it can be observed that when the proportion of diester increases to over 50% it reduces the distribution factor.

Example 2

A test on the suitability of a diester of 2,2,4-trialkyl-1,3-pentanediol-based extraction reagent mixture was performed in the laboratory in a test tube. The feed solution used was an 8 M hydrochloric acid solution, the composition of which was adjusted by means of metal salts in accordance with Table 1 below, with the aim of obtaining a composition corresponding to that typical of an anode slime generated in copper electrolysis, after the selenium has been removed from it:

TABLE 1

| | mg/L |
|---|---|
| Ag | 16.2 |
| As | 35.2 |
| Au | 4410 |
| Bi | 7.5 |

TABLE 1-continued

| | mg/L |
|---|---|
| Cu | 90.5 |
| Fe | 7.5 |
| Pd | 1520 |
| Pt | 408 |
| Te | 183 |

After scrubbing, stripping and reduction, SEM images were taken of the product and an elemental analysis was made, on the basis of which it can be stated that, practically speaking, the product is pure gold. FIG. 4 is an SEM image that showed that the material identified at all points of the image was pure gold.

Example 3

The feed solution of this example illustrates another hydrochloric acid solution obtained from anode slime leaching, in which the hydrochloric acid solution was 5 mol/L. In comparison with example 2, it included several impurity metals and the concentrations of some of the impurities were considerably greater than in example 2. The concentrations are given in Table 2:

TABLE 2

| Composition of feed solution: | |
|---|---|
| | mg/L |
| Ag | 13.3 |
| As | 13300 |
| Au | 3980 |
| Bi | 35300 |
| Cu | 9500 |
| Fe | 11.5 |
| Pd | 1320 |
| Pt | 355 |
| Sb | 4000 |
| Se | 12600 |
| Te | 183 |

The composition of the extraction phase was 50 wt % 2,2,4-trimethyl-1,3-pentanediol di-isobutyrate diluted in 2-ethylhexanol. The volumetric ratio of the phases i.e. the O/A ratio, was 1.2, the temperature 40° C. and extraction time 15 min. Two consecutive extractions were made, after which the composition of the extraction raffinate was as follows:

TABLE 3

| | mg/L | |
|---|---|---|
| Ag | 11.8 | (11%) |
| As | 7900 | (40%) |
| Au | 0.5 | (99.99%) |
| Bi | 34528 | (2%) |
| Cu | 8780 | (3%) |
| Fe | 0.01 | (100%) |
| Pd | 987 | (25%) |
| Pt | 216 | (39%) |
| Sb | 72 | (98%) |
| Se | 5600 | (56%) |
| Te | 2 | (100%) |

Table 3 reports the extraction percentage of each metal after the analysis results. It can be seen that not only gold but also Se, Te and Sb are also extracted.

After extraction, the scrubbing of the extraction phase was done from the same organic phase alternatively with two different hydrochloric acid solutions, one of which had a hydrochloric acid concentration of 3 mol/L and the other 5 mol/L. In both cases the O/A ratio was 1:1 and the temperature 40° C. After equilibration, the following scrubbing results were obtained:

TABLE 4

| | Scrubbing degree (%) | |
|---|---|---|
| | [HCl] = 3 mol/L | [HCl] = 5 mol/L |
| Ag | 83 | 83 |
| As | 92 | 82 |
| Au | 3.7 | 1.2 |
| Bi | 95 | 92 |
| Cu | 96 | 94 |
| Fe | 92 | 14 |
| Pd | 89 | 83 |
| Pt | 90 | 82 |
| Sb | 18 | 2 |
| Se | 80 | 72 |
| Te | 87 | 38 |

The scrubbing results show that the hydrochloric acid concentration affects the extracting of both gold and impurity metals. As shown in Table 3, the hydrochloric acid concentration affects the scrubbing of iron, antimony and tellurium in particular. Therefore, depending on the quality and concentration of the impurity metals, it is worth carrying out scrubbing in several steps so that they have a different hydrochloric acid concentration.

Gold was stripped with pure water in three steps from organic solution that had been scrubbed in three steps and was then reduced with oxalate. The purity of the reduced gold was >99.99% irrespective of whether the concentration of the hydrochloric acid used in scrubbing was 3 or 5 mol/L.

Example 4

The purpose of the test is to show that extraction of gold can occur simultaneously with gold leaching.

In a laboratory test 1 g of metallic gold was leached into 8 M hydrochloric acid in a glass container while simultaneously being oxidised with hydrogen peroxide and being mixed with the extraction reagent. The composition of the extraction reagent was the same as in example 3, the ratio of organic to aqueous phase was 0.7 and the temperature was 45° C. The mixture was stirred for 120 min, after which 56% of the gold had dissolved. It was found that at the same time 93% of the dissolved gold had been extracted into the organic phase. The organic phase was scrubbed with 3 M hydrochloric acid at a phase ratio of 1:1, whereupon about 9% of the gold was scrubbed out. Gold stripping was performed with pure water in three steps as a crosscurrent extraction at an O/A ratio of 1:3. The total yield of gold in stripping was 94.6%. Reduction to metallic gold was done with oxalate.

The example shows that the "solvent-in-leach" method works with pure gold. However it is clear that the method also works in all cases where gold can be leached with hydrochloric acid. The solid may thus be a gold-bearing ore, concentrate, anode slime, ash, scrap or adsorbent.

References
1. Marsden J., House, I.: The chemistry of gold extraction, $2^{nd}$. ed., Society for Mining, Metallurgy and Exploration, Colorado, USA 2006
2. Hoffmann, J. E. et al: Hydrometallurgical processing of Kennecott Refinery slimes, Proceedings of COPPER 95-COBRE 95 International Conference, Vol. III, pp. 41-57.
3. Lopatin, G. S. et al.: (1961); Izv. Vyssh. Ucheb. Zavedenii, Tsvet. Mat. 4(4)
4. Grant, R. A. et al: The application of solvent extraction to the refining of gold; Proceedings of the International Solvent Extraction Conference ISEC 2002, pp 940-945
5. International Program on Chemical Safety (IPCS), Screening Information Data Sheet for CAS No 6845-50-0, December 1994.
6. Toraiwa, A., et al.: Shigen to Sozai 116 (2000) 484-492.

The invention claimed is:

1. A method for extracting gold selectively from its acidic chloride-based aqueous solution or solid-containing slurry by solvent extraction to produce pure gold, comprising using a diester of 2,2,4-trialkyl-1,3-pentanediol as an organic extraction reagent in solvent extraction; a gold-bearing organic solution that is formed is scrubbed with an acidic aqueous solution, after which gold is stripped into water, from where it is reduced to form pure gold.

2. The method according to claim 1, wherein a mixture of a diester of 2,2,4-trialkyl-1,3-pentanediol and a branched long-chain alcohol is used as the extraction organic reagent.

3. The method according to claim 2, wherein the long-chain alcohol is 2-ethylhexanol.

4. The method according to claim 2, wherein the diester of 2,2,4-trialkyl-1,3-pentanediol is 2,2,4-trimethyl-1,3-pentanediol di-isobutyrate or a derivative thereof.

5. The method according to claim 4, wherein a hydrogen atom, an alkyl group or an aryl group is substituted for one or more methyl groups in a side chain of 2,2,4-trimethyl-1,3-pentanediol di-isobutyrate.

6. The method according to claim 2, wherein extraction takes place simultaneously with leaching of gold-bearing solid contained in the solid-containing slurry.

7. The method according to claim 1, wherein the diester of 2,2,4-trialkyl-1,3-pentanediol is 2,2,4-trimethyl-1,3-pentanediol di-isobutyrate or a derivative thereof.

8. The method according to claim 7, wherein a hydrogen atom, an alkyl group or an aryl group is substituted for one or more methyl groups in the side chain of the molecular structure of the 2,2,4-trimethyl-1,3-pentanediol di-isobutyrate.

9. The method according to claim 1, wherein extraction takes place simultaneously with leaching of the gold-bearing solid contained in the solid-containing slurry.

10. The method according to claim 9, wherein the gold-bearing solid is at least one selected from a group consisting of: gold ore, concentrate, anode slime, ash, scrap, ion exchanger used in gold recovery, activated carbon used in gold recovery and adsorbent used in gold recovery.

11. The method according to claim 1, wherein after the solvent extraction, the gold-bearing organic solution is routed to a scrubbing stage in order to scrub out of extraction solution impurity metals extracted into it, where an aqueous solution of hydrochloric acid with a concentration of 1.5-8 mol/L, is used as the scrubbing solution.

12. The method according to claim 11, wherein the scrubbing stage contains at least two scrubbing steps, where an aqueous solution of hydrochloric acid having a concentration of greater than 2 mol/L is used in a first scrubbing step and an aqueous solution of hydrochloric acid having a concentration the same or lower than that in the first scrubbing step is used in a second scrubbing step.

13. The method according to claim 11, wherein in the scrubbing stage selenium, antimony and tellurium extracted into the organic solution is scrubbed out, and the scrubbing solution is routed to a selenium extraction stage, in which a diester is used as the organic extraction solution.

14. The method according to claim 1, wherein a stripping stage of an organic extraction solution exiting a scrubbing stage is performed as a crosscurrent extraction.

15. The method according to claim 14, wherein the stripping stage of the organic extraction solution is performed after the scrubbing stage in at least two steps using pure water in both stages.

16. The method according to claim 15, wherein in a scrubbing step selenium, antimony and tellurium extracted into the organic extraction solution is scrubbed out, and the scrubbing solution is routed to a selenium extraction stage, in which a diester is used as the organic extraction solution.

17. The method according to claim 1, wherein a stripping stage of an organic extraction solution exiting a scrubbing stage is performed as a countercurrent extraction.

18. The method according to claim 1, wherein a gold stripping stage of the organic extraction solution is performed after a scrubbing stage in at least two stripping steps using pure water in both stages.

19. The method according to claim 18, wherein gold-bearing aqueous solutions exiting stripping steps are combined and pure gold is recovered from an aqueous solution obtained from the stripping in a reduction stage.

20. The method according to claim 1, wherein gold is reduced from an aqueous solution obtained from the stripping by oxalic acid or a salt thereof.

21. The method according to claim 1, wherein gold is reduced from an aqueous solution obtained from the stripping by sodium borohydride.

22. The method according to claim 1, wherein gold is reduced from an aqueous solution obtained from the stripping by electrolysis.

23. The method according to claim 1, wherein the acidic chloride-bearing aqueous solution containing gold or the solid-containing slurry from which gold is extracted is an aqueous solution of hydrochloric acid.

24. The method according to claim 1, wherein after the solvent extraction the gold-bearing organic solution that is formed is routed to a scrubbing stage in order to scrub out of the extraction solution impurity metals extracted into it, where an aqueous solution of hydrochloric acid with a concentration of 2-6 mol/L is used as the scrubbing solution.

25. The method according to claim 24, wherein the scrubbing stage contains at least two scrubbing steps, where the hydrochloric acid concentration of its aqueous solution is greater than 2 mol/L in a first scrubbing step and the hydrochloric acid concentration of a second scrubbing step is the same or lower than that in the first scrubbing step.

26. The method according to claim 24, wherein in the scrubbing step selenium, antimony and tellurium extracted into the organic extraction solution is scrubbed out, and the scrubbing solution is routed to a selenium extraction stage, in which a diester is used as the organic extraction solution.

* * * * *